Nov. 5, 1957 G. RUNKEN 2,812,042
BRAKE SLACK ADJUSTER
Filed June 12, 1956 3 Sheets-Sheet 1
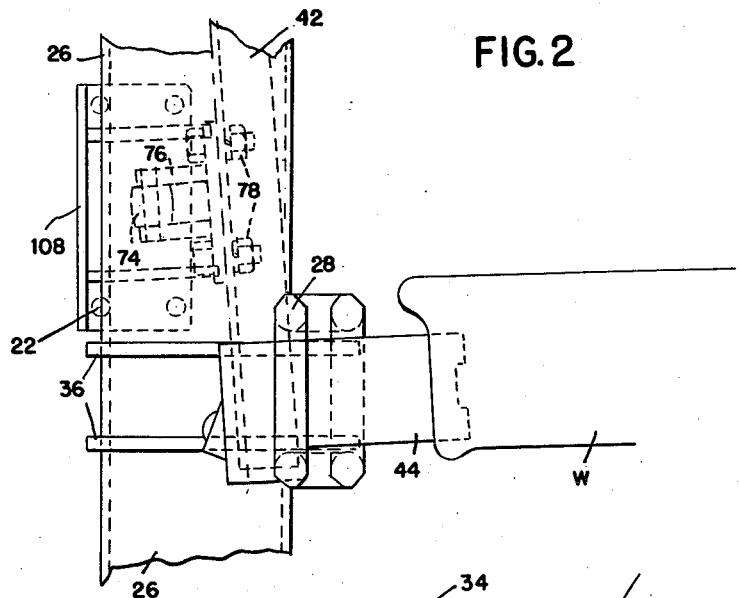
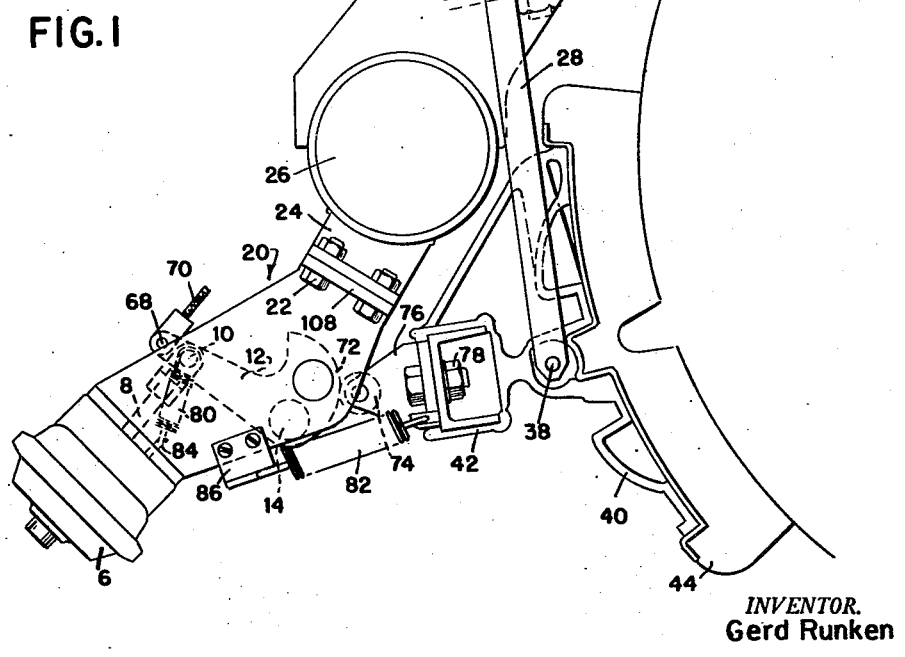
INVENTOR.
Gerd Runken
BY
Robert A. Shields
ATTORNEY Nov. 5, 1957 G. RUNKEN 2,812,042
BRAKE SLACK ADJUSTER
Filed June 12, 1956 3 Sheets-Sheet 2
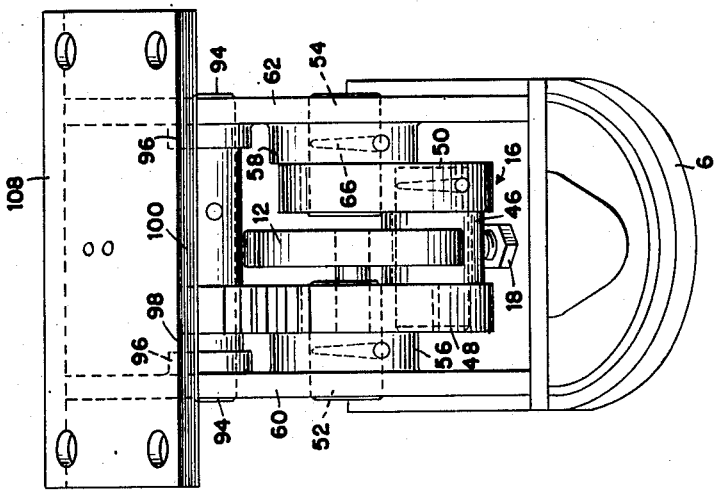
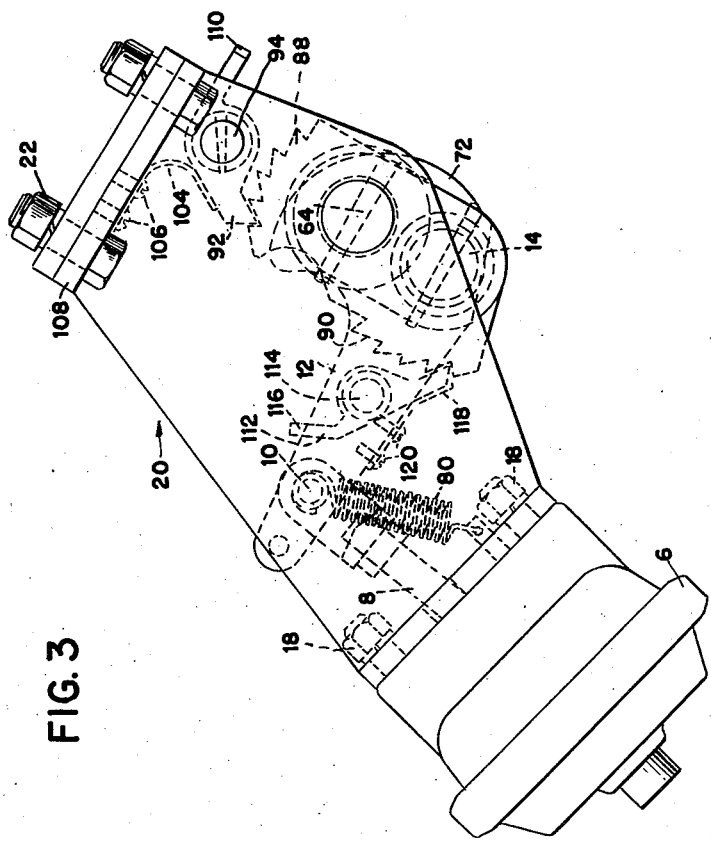
INVENTOR.
Gerd Runken
BY
Robert A. Shields
ATTORNEY Nov. 5, 1957 G. RUNKEN 2,812,042
BRAKE SLACK ADJUSTER
Filed June 12, 1956 3 Sheets-Sheet 3

INVENTOR.
Gerd Runken
BY
*Robert A. Shield*
ATTORNEY

United States Patent Office 2,812,042
Patented Nov. 5, 1957

2,812,042

BRAKE SLACK ADJUSTER

Gerd Runken, Cold Spring, N. Y., assignor to ACF Industries, Incorporated, New York, N. Y., a corporation of New Jersey Application June 12, 1956, Serial No. 590,867

8 Claims. (Cl. 188—198)

This invention relates to automatic slack adjusters for railway car brake rigging in which excess slack in the rigging due to wear of the brake shoes is taken up by shifting the fulcrum of a brake lever. Shifting of the brake lever fulcrum restores the proper clearance between the worn brake shoes and wheels to permit full application of the brakes with normal travel or length of stroke of the brake cylinder piston.

Devices of this type are generally more or less complicated mechanisms comprising many moving parts and are either not fully automatic in operation or do not positively provide the proper amount of slack in the brake rigging.

It is an object of the present invention to provide a fully automatic slack adjuster of the above type comprising relatively few essential parts, compact and simple in construction, and positive in operation.

Another object of the invention is to provide a slack adjuster device as above described comprising a novel arrangement of shiftable brake lever fulcrum or hanger member and ratchet and pawl control.

A further object of the invention is to provide a device of the type described in which the fulcrum of the brake lever is shifted to adjusted position directly by the brake lever, thus eliminating the use of gearing, racks, linkage, pull rods or similar mechanism for this purpose.

These and other objects of the invention will be apparent to those skilled in the art from a study of the following description taken with the accompanying drawings in which:

Fig. 1 is a side elevational view of brake rigging embodying the automatic slack adjuster of the present invention with the brake lever shown by broken lines in the brake applying position:

Fig. 2 is a partial top plan view of the brake rigging shown in Fig. 1;

Fig. 3 is an enlarged side elevational view of the brake unit per se showing in broken lines the brake lever and associated mechanism more in detail;

Fig. 4 is an end view of the device looking to the left toward Fig. 3, and

Figure 5:
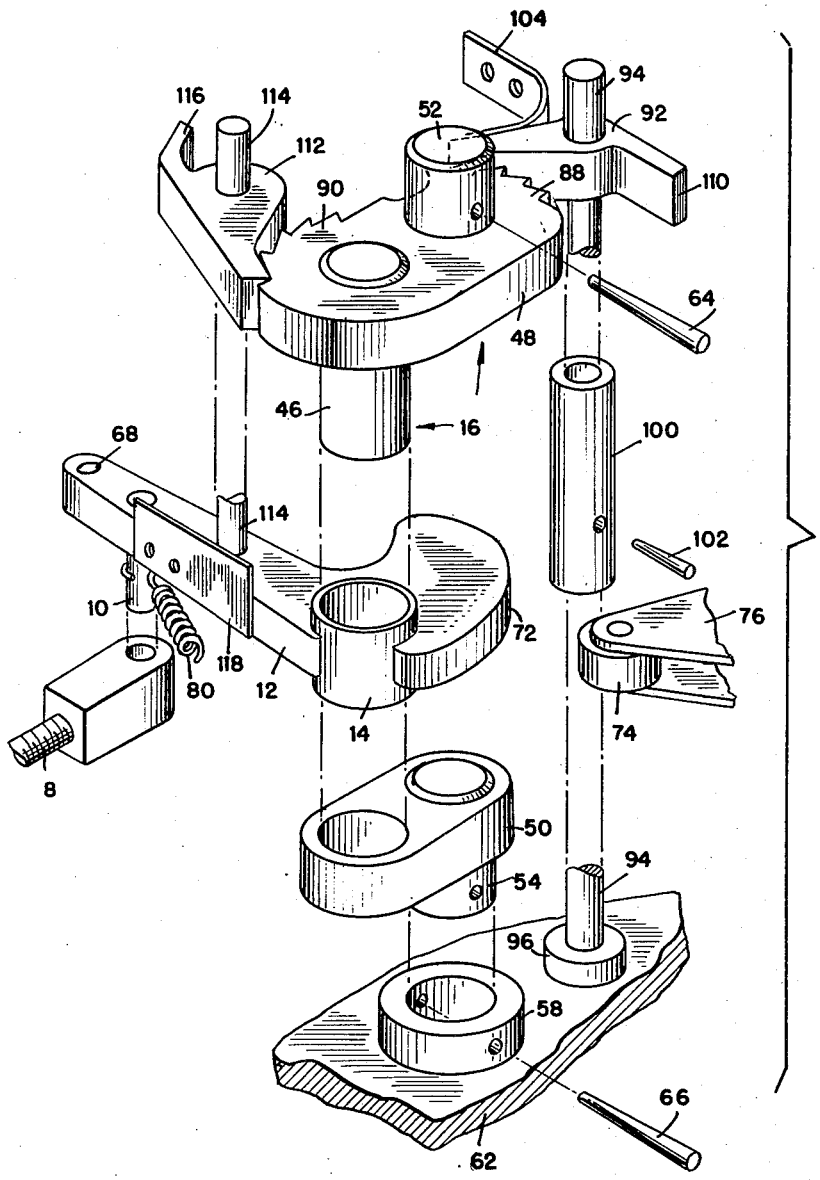
Fig. 5 is an enlarged perspective exploded view of the brake applying and slack adjuster parts.

Referring now more in deatail to the drawings, the brake rigging comprises a brake cylinder 6 having a piston or push rod 8 pivotally connected at 10 to a brake lever 12 adjacent one end thereof, the brake lever being fulcrumed adjacent its other end at 14 on a shiftable brake lever hanger or fulcrum member generally indicated at 16. The air brake cylinder 6 as shown is of the resiliently mounted automotive type, but may be of any other suitable type, bolted at 18 to a supporting bracket generally indicated at 20 which in turn is bolted at 22 to bracket 24 fixed to a rigid cross member 26 of the truck (not shown). The brake rigging also includes, at opposite sides of the truck, brake hangers 28 pivoted at 30 in brackets or the like 32 bolted at 34 to support or mounting structures 36 rigidly secured in any suitable manner to the truck cross member 26. The brake hangers 28 pivotally carry at 38 brake heads 40 connected with a brake beam 42 and provided with brake shoes 44 for application to the truck wheels W.

The shiftable brake lever hanger or fulcrum member 16, as more clearly shown in Fig. 5, comprises a crank shaft 46 having arms 48, 50 journalled on stub shafts 52, 54, which in turn are retained in bosses 56, 58 on opposite side walls 60, 62 of supporting bracket 20 by pins 64, 66, respectively. Arms 48, 50 carry the crank shaft 46 on which brake lever 12 is fulcrumed at 14, as previously described. The brake lever may be fulcrumed on the crank shaft in any suitable manner; as for example, the crank shaft may be journalled in arms 48, 50 with the brake lever fixed to a fulcrum in the form of a bushing 14, as shown, or the brake lever may be fixed directly on the crank shaft 46. A hole 68 is drilled in the brake lever 12 adjacent the cylinder push rod pivot 10 for connection with hand brake mechanism indicated at 70 in Fig. 1. The brake lever is rotatable or rockable about its fulcrum 14 in the clockwise direction, as viewed in Figs. 1, 3 and 5, to apply the brakes and in the reverse direction to release them, being formed with a cam end portion 72 engaging a roller 74 carried by a bracket 76 bolted at 78 to the brake beam 42. The cam portion 72 of the brake lever is of such contour as to apply the proper amount of compression against roller 74 to effect full application of the brakes at all times with normal travel or stroke of cylinder push rod 8. The brake lever and brake beam are constantly urged to released position by tension coil springs 80, 82, respectively, connected thereto and to the bracket 20 by any suitable means such as anchor tabs 84, 86.

Arm 48 of the crank shaft 46 is formed with two rows or series of ratchet teeth 88, 90, the teeth 88 being engaged by a pawl 92 mounted on shaft 94 journalled in bosses 96 on side walls 60, 62 of support bracket 20 and retained in position by spacers 98, 100, the latter being fixed to the shaft by a pin 102. The pawl 92 normally holds crank shaft 46 against swinging movement in the clockwise direction as viewed in Figs. 3 and 5; that is, against the force applied during application of the brakes. The pawl 92 is resiliently held in ratchet engaging position by a suitable spring 104 secured by screws 106 to attaching plate 108 of bracket 20 and has a manual releasing handle 110. A second pawl 112 is pivotally carried at 114 by the brake lever 12 and normally slidably engages one of the ratchet teeth 90 during application and release of the brakes. This second pawl also is provided with a manual release handle 116 and retained in ratchet engaging position by a flat spring 118 secured to the brake lever by screws 120.

In operation and assuming the brake shoes are new, pawl 92 will be operatively engaged with the first tooth of ratchet 88 while pawl 112 will be slidably engaged with the first tooth of ratchet 90, both as viewed in Figs. 3 and 5. With successive applications of the brakes and wear of the brake shoes, the length of stroke or travel of brake beam 42 and roller 74 will increase, but this is compensated for by the fact that the roller will progressively ride higher up on cam portion 72 of brake lever 12 to insure continuous and uniform full application of the brakes. This continues until the brake shoes have been worn a predetermined amount; that is, until brake lever 12 has been rotated far enough in the brake applying direction (clockwise as viewed in Figs. 3 and 5) due to brake shoe wear to carry pawl 112 into operative engagement with the second tooth of ratchet 90. Thus upon the next rotation of brake lever 12 in the reverse or brake release direction, the latter will swing crank shaft 46 of shiftable fulcrum member 16 counterclockwise as viewed in Figs. 3 and 5 to adjusted position with pawl 92 now operatively engaged with the second tooth of ratchet 88. It will also be seen that relative engagement of brake lever cam portion 72 with brake beam roller 74 has now been restored to its initial position and that the cycle of operation described will be repeated until pawls 112, 92 operatively engage the third teeth and so on of ratchets 90, 88, respectively, in that order. The fulcrum member 16 will thus be successively shifted to adjusted positions until wear of the brake shoes require replacement by new ones, when pawls 92, 112 may be manually released from ratchets 88, 90, respectively, and fulcrum member 16 swung clockwise as viewed in Figs. 3 and 5 back to its initial position with the pawls again engaging the first teeth of the ratchets.

From the foregoing description it will be seen that a fully automatic and compact brake rigging slack adjuster has been provided which is of relatively simple construction and positive in operation. The compact arrangement of ratchet and pawl control for the brake lever fulcrum member by which the latter is shifted to adjusted position more or less directly by the brake lever, results in a device of this type having a minimum of parts. While the device is shown and described as applied to the brake rigging for only two wheels and primarily intended for use with light-weight fixed-axle four-wheel cars, it is also adapted for use in the foundation brake rigging of standard four-wheel railway car trucks.

The invention may be modified in various respects as will occur to those skilled in the art and the exclusive use of all modifications as come within the scope of the appended claims is contemplated.

What is claimed is:

1. In an automatic slack adjuster for railway car brake rigging, a swingable brake lever hanger member on the car structure, a brake lever operatively associated with said rigging and fulcrumed on said hanger member, means for preventing swinging movement of said hanger member in one direction relative to the car structure, and means carried by said brake lever operative to swing said hanger member in the opposite direction whereby to shift the fulcrum of the brake lever to adjusted position to compensate for brake shoe wear, said last-named means being operative to swing said hanger member upon rotation of said brake lever in the brake releasing direction after the latter has been rotated in the brake applying direction beyond a predetermined amount due to excess slack in the brake rigging.

2. In an automatic slack adjuster for railway car brake rigging, a ratcheted brake lever hanger member swingably supported from the car structure, a brake lever operatively associated with said rigging and fulcrumed on said ratcheted hanger member, said brake lever being rotatable in one direction to apply and in the opposite direction to release the brakes, a first pawl for preventing swinging movement of said hanger member in one direction relative to the car structure, and a second pawl carried by said brake lever operative to swing said hanger member in the opposite direction whereby to shift the fulcrum of the brake lever to adjusted position to compensate for brake shoe wear, said second pawl being operative to swing said hanger member upon rotation of said brake lever in the brake releasing direction after the latter has been rotated in the brake applying direction beyond a predetermined amount due to excess slack in the brake rigging.

3. In an automatic slack adjuster for railway car brake rigging including a brake beam, a brake lever hanger member swingably mounted on the car structure, a brake lever operatively connected in said rigging and fulcrumed on said hanger member, said brake lever having a cam portion engaging said brake beam and being rotatable in one direction to apply and in the opposite direction to release the brakes, means for preventing swinging movement of said brake lever hanger member in one direction relative to the car structure, and means carried by said brake lever operative to swing said brake lever hanger member in the opposite direction whereby to shift the fulcrum of the brake lever to adjusted position to compensate for brake shoe wear, said last-named means being operative to swing said brake lever hanger member upon rotation of said brake lever in the brake releasing direction only after the latter has been rotated in the brake applying direction beyond a predetermined amount due to excess slack in the brake rigging.

4. In an automatic slack adjuster for railway car brake rigging including a brake beam, a swingable brake lever hanger member suspended from the car structure, a brake lever operatively connected with said rigging and fulcrumed on said hanger member, anti-friction means on said brake beam, said brake lever having a cam portion engaging said anti-friction means and being rotatable in one direction to apply and in the opposite direction to release the brakes, means for holding said hanger member against swinging movement in one direction relative to the car structure, and means carried by said brake lever operative to swing said hanger member in the opposite direction whereby to shift the fulcrum of the brake lever to adjusted position to compensate for brake shoe wear, said last-named means being operative to swing said hanger member upon rotation of said brake lever in the brake releasing direction only after the latter has been rotated in the brake applying direction beyond a predetermined amount due to excess slack in the brake rigging.

5. In an automatic slack adjuster for railway car brake rigging, a crank shaft carried by the car structure, a brake lever operatively associated with said rigging and fulcrumed on said crank shaft, said brake lever being rotatable in one direction to apply and in the opposite direction to release the brakes, means for holding said crank shaft against swinging movement in one direction relative to the car structure, and means on said brake lever operative to swing said crank shaft a predetermined amount in the opposite direction whereby to shift the brake lever fulcrum to adjusted position to compensate for brake shoe wear, said last-named means being operative to swing said crank shaft upon rotation of said brake lever in the brake releasing direction immediately after the same has been rotated in the brake applying direction beyond a predetermined amount due to excess slack in the brake rigging.

6. In an automatic slack adjuster for railway car brake rigging, a crank shaft swingably carried by the car structure and having at least one arm thereof provided with ratchet means, a brake lever operatively connected in said rigging and fulcrumed on said crank shaft, said brake lever being rotatable in one direction to apply and in the opposite direction to release the brakes, a first pawl engaging said ratchet means for preventing swinging movement of said crank shaft in one direction relative to the car structure, and a second pawl carried by said brake lever normally slidably engaging but adapted to operatively engage said ratchet means to swing said hanger member a predetermined amount in the opposite direction whereby to shift the fulcrum of the brake lever to adjusted position to compensate for brake shoe wear, said second pawl being operative to swing said hanger member upon rotation of said brake lever in the brake releasing direction only after the same has been rotated in the brake applying direction beyond a predetermined amount due to excess slack in the brake rigging.

7. In an automatic slack adjuster for railway car brake rigging, a shiftable brake lever fulcrum member comprising a crank shaft swingably supported from the car structure, said crank shaft having at least one arm thereof provided with ratchet teeth, a brake lever operatively associated with said rigging and fulcrumed intermediate its ends on said crank shaft, said brake lever being rotatable in opposite directions to apply and to release the brakes, a first pawl on the car structure engaging said ratchet teeth to prevent swinging movement of said crank shaft in one direction relative to the car structure but permitting it in the opposite direction, and a second pawl carried by and movable with said brake lever normally inoperatively engaging but adapted to operatively engage said ratchet teeth to swing said crank shaft a predetermined amount in the opposite direction whereby to shift the brake lever fulcrum to adjusted position to compensate for brake shoe wear, said second pawl being operative to swing said hanger member only upon rotation of said brake lever in the brake releasing direction after the same has previously been rotated in the brake applying direction beyond a predetermined amount due to excess slack in the brake rigging.

8. In an automatic slack adjuster for railway car brake rigging including a brake beam, a shiftable brake lever fulcrum member comprising a crank shaft carried by the car structure, a brake lever operatively associated with said rigging and fulcrumed on said crank shaft, a roller interposed between said brake beam and brake lever, said brake lever being rotatable in opposite directions to apply and to release the brakes, means for preventing swinging movement of said crank shaft in one direction relative to the car structure, and means carried by said brake lever operative to swing said crank shaft a predetermined amount in the opposite direction whereby to shift the fulcrum of the brake lever to adjusted position to compensate for brake shoe wear, said last-named means being operative to swing said crank shaft upon rotation of said brake lever in the brake releasing direction only after the same has previously been rotated in the brake applying direction beyond a predetermined amount due to excess slack in the brake rigging.

No references cited.